(12) United States Patent
Lee

(10) Patent No.: US 8,120,733 B2
(45) Date of Patent: Feb. 21, 2012

(54) LIQUID CRYSTAL DISPLAY DEVICE AND METHOD FOR MANUFACTURING THE SAME

(75) Inventor: Kyoung Mee Lee, Seoul (KR)

(73) Assignee: LG Display Co., Ltd, Seoul (KR)

( * ) Notice: Subject to any disclaimer, the term of this patent is extended or adjusted under 35 U.S.C. 154(b) by 970 days.

(21) Appl. No.: 11/646,425

(22) Filed: Dec. 28, 2006

(65) Prior Publication Data

US 2008/0002136 A1    Jan. 3, 2008

(30) Foreign Application Priority Data

Jun. 28, 2006 (KR) .................. 10-2006-0058597

(51) Int. Cl.
    G02F 1/1335    (2006.01)
    G02F 1/1339    (2006.01)
(52) U.S. Cl. .................. 349/107; 349/106; 349/155
(58) Field of Classification Search .......... 349/106–109, 349/155–157
    See application file for complete search history.

(56) References Cited

U.S. PATENT DOCUMENTS

| | | | | |
|---|---|---|---|---|
| 2001/0026347 A1* | 10/2001 | Sawasaki et al. | ............. | 349/156 |
| 2002/0036732 A1* | 3/2002 | Kim | ............. | 349/113 |
| 2003/0011729 A1* | 1/2003 | Song et al. | ............. | 349/107 |
| 2003/0128309 A1* | 7/2003 | Yamada | ............. | 349/106 |
| 2004/0150769 A1* | 8/2004 | Tokuda et al. | ............. | 349/106 |
| 2005/0110922 A1* | 5/2005 | Lee et al. | ............. | 349/106 |
| 2005/0243247 A1* | 11/2005 | Ryu | ............. | 349/106 |

FOREIGN PATENT DOCUMENTS

| | | |
|---|---|---|
| KR | 10-2005-0058041 A | 6/2005 |
| KR | 10-2006-0051849 A | 5/2006 |

OTHER PUBLICATIONS

Office Action issued Sep. 29, 2009 in corresponding Korean Application No. 10-2006-0058597.

* cited by examiner

*Primary Examiner* — Jessica M Merlin

(74) *Attorney, Agent, or Firm* — Morgan, Lewis & Bockius LLP

(57) ABSTRACT

A liquid crystal display device includes a first substrate and a second substrate facing each other, a plurality of gate lines and a plurality of data lines on the first substrate crossing each other to define pixel regions, a black matrix layer on the second substrate in regions corresponding to the gate lines and the data lines, color filter layers on the second substrate covering at least the pixel regions, a plurality of column spacers on respective portions of the black matrix layer excluding the color filter layers, and a liquid crystal layer between the first substrate and the second substrate.

13 Claims, 8 Drawing Sheets

US 8,120,733 B2

LIQUID CRYSTAL DISPLAY DEVICE AND METHOD FOR MANUFACTURING THE SAME

This application claims the benefit of Korean Patent Application No. 10-2006-0058597, filed on Jun. 28, 2006, which is hereby incorporated by reference in its entirety.

BACKGROUND OF THE INVENTION

1. Field of the Invention

Embodiments of the present invention relate to a liquid crystal display (LCD) device, and more particularly, to a method for manufacturing an LCD device. Embodiments of the invention are suitable for a wide scope of applications. In particular, embodiments of the invention are suitable for reducing a non-uniformity associated with a layering topology of the LCD device.

2. Discussion of the Related Art

The progress toward information-driven society has pushed the demand for various display devices. To meet such a demand, efforts have recently been made to develop flat panel display devices such as liquid crystal display (LCD) devices, plasma display panels (PDPs), electro-luminescent display (ELD) devices, vacuum fluorescent display (VFD) devices, and the like. Such flat panel display devices have been applied to various appliances.

In particular, LCDs have been used as a substitute for cathode ray tubes (CRTs) in association in mobile applications because of their superior picture quality, lightness, thinness, and low power consumption. Currently, LCDs are widely used not only as monitors for notebook computers, but also for desktop computers and television (TV) receivers. Successful application of LCDs to more diverse image display devices depends on whether the LCDs can produce high picture quality including high resolution, high brightness, large display area, and the like, while remaining light, thin, and consuming low power.

Generally, an LCD includes a first substrate and a second substrate joined spaced apart from each other, with a liquid crystal material between the first and second substrates. The first substrate includes a plurality of gate lines arranged in one direction and uniformly spaced apart from one another, and a plurality of data lines arranged crossing the gate lines and uniformly spaced apart from one another, to define pixel regions P. The first substrate also includes a plurality of pixel electrodes formed at respective pixel regions P, and a plurality of thin film transistors (TFTs) each formed at a crossing between a corresponding one of the gate lines and a corresponding one of the data lines. A data signal on each data line is applied to a corresponding one of the pixel electrodes in response to a signal applied to a corresponding one of the gate lines.

The second substrate includes a black matrix layer for blocking light incident to a region other than the pixel regions P. The second substrate also includes R, G, and B color filter layers formed at a region corresponding to each pixel region P for displaying color images, and a common electrode formed on the color filter layers to produce a voltage difference with respect to the pixel electrode corresponding to a pixel region.

The liquid crystals of the liquid crystal layer are oriented in a certain direction by an electric field generated between the corresponding pixel electrode and the corresponding common electrode. The amount of light passing through the liquid crystal layer is controlled in accordance with the orientation of the liquid crystal layer, to display a desired image.

The LCD having the above-mentioned driving principle is called a twisted nematic (TN) mode LCD. However, such a TN mode LCD has a narrow view image. In order to overcome the drawback of the TN mode LCD, an in-plane switching (IPS) mode LCD has been developed. In the IPS mode LCD, a pixel electrode and a common electrode are formed on a first substrate at each pixel region of the first substrate such that the pixel electrode and common electrode extend parallel to each other, to generate an in-plane electric field (i.e., horizontal field). The liquid crystal layer is oriented in a certain direction by the in-plane electric field.

Spacers are formed between the first and second substrates to secure a certain space for sealing the liquid crystal layer between the first and second substrates. Spacers are classified into ball spacers and column spacers depending on their shape. The ball spacers have a ball-shape, and are formed on the first and second substrates in accordance with a spraying method. Even after the first and second substrates are joined together, the ball spacers are more or less movable, and have a small area contacting with the first and second substrates. Meanwhile, column spacers are formed on the first and second substrates by an array process. Each column spacer is fixed in the form of a column having a certain height on one of the substrates. Thus, the column spacers have a relatively large area contacting with the first and second substrates, as compared to ball spacers.

FIG. 1 shows a planar view of a first substrate of the related art LCD device. FIG. 2 shows a cross-sectional view along line I-I' of FIG. 1. Referring to FIGS. 1 and 2, a first substrate 2 includes a black matrix layer 11 formed on the first substrate 2 in a region other than pixel regions P. The first substrate 2 also includes color filter layers 12 12a, 12b and 12c. The color filter layers 12a, 12b and 12c are formed to be spaced apart from one another on the first substrate 2 including the black matrix layers 11. The first substrate 2 also includes a common electrode 13. The common electrode 13 is formed over the entire upper surface of the first substrate 2 including the black matrix layer 11 and the color filter layers 12. The first substrate 2 also includes column spacers 20 respectively formed on the common electrode 13 in regions corresponding to predetermined portions of the black matrix layer 11.

The first substrate 2 faces a second substrate (not shown) having a thin film transistor array (not shown). The first substrate 2 and the second substrate are spaced apart from each other by the column spacers 20.

As shown in FIG. 2, the color filter layers 12, including the color filter layers 12a, 12b and 12c, have different heights to compensate for differences in transmissivity caused by different material characteristics of the R, G and B color filter layers 12a, 12b and 12c. Thus, the color filter layers 12a, 12b and 12c have the same transmissivity. For example, the R, G and B color filter layers 12a, 12b and 12c have different heights h1, h2 and h3, respectively. Accordingly, although the column spacers 20 have the same thickness or height H, the levels of the upper surfaces of the column spacers 20 measured from an upper surface of the first substrate 2 may be different when the column spacers 20 are arranged on different regions. For example, as shown in FIG. 2, when the G, R and B color filter layers 12b, 12a and 12c have a first height h1, a second height h2, and a third height h3, respectively, there is a difference in level among the upper surfaces of column spacers 20 arranged on the respective color filter layers 12a, 12b and 12c, due to the difference in height between the color filter layers 12a, 12b and 12c. In this case, the difference in level between the upper surface of the column spacer 20 formed on the B color filter layer 12c having the largest height (h3) and the upper surface of the column spacer 20 formed on the G color filter layer 12b having the smallest height (h1) corresponds to "h3−h1". Also, the difference in level between the upper surface of the column spacer formed on the R color filter layer 12a having the largest height (h2) and the upper surface of column spacer formed on the G color filter layer 12b having the smallest height (h1) corresponds to "h2−h1."

On the other hand, the color filter layers 12a, 12b and 12c may be respectively formed by different patterning processes, so that they have different heights. In this case, the column spacers 20 formed on the respective color filter layers having a difference in height due to the height difference of the color filter layers 12a, 12b and 12c underneath. Thus, it is difficult to ensure a uniform cell gap in different regions between the first substrate 2 and the second substrate, after the first substrate 2 and the second substrate are joined together. The resulting non-uniform cell gap causes a defective image to be displayed.

Thus, the above-mentioned related art LCD device and the above-mentioned related art method for manufacturing the LCD device have the following problems. In the related art LCD device, the column spacers are formed on the color filter layers having a stripe structure, respectively. The respective heights of the column spacers formed on different color filter layers are different. The upper surfaces of the column spacers differ in levels in different regions. Thus, a difference in cell gap occurs in different regions of the LCD device. Such a difference in cell gap causes a variation in optical properties across different regions. As a result, defective image display may occur.

Moreover, the amount of the liquid crystal material filled in the space between the first substrate and the second substrate depends on the column spacer height. However, the difference in level among the upper surfaces of the column spacers caused by the difference in height of the color filter layers makes it difficult to accurately estimate the amount of the liquid crystal material for each liquid crystal cell. Accordingly, the estimated amount of the liquid crystal material could be erroneous, thereby causing an insufficient or excessive filling of the liquid crystal material.

When an insufficient amount of the liquid crystal material is filled between the first and second substrates, the liquid crystal material may shift to a particular portion of the liquid crystal panel and take a long time to be redistributed uniformly across the liquid crystal panel. As a result, the displayed image is defective until the liquid crystal material returns to its original state. On the other hand, when an excessive amount of the liquid crystal material is filled between the first and second substrates, the liquid crystal material flows downward and forms a bulge at the bottom of the liquid crystal panel because of gravity effects to a great expansion of the liquid crystal at high temperature.

SUMMARY OF THE INVENTION

Accordingly, the present invention is directed to a liquid crystal display device and a method for manufacturing the same that substantially obviate one or more problems due to limitations and disadvantages of the related art.

An object of the present invention is to provide a liquid crystal display device and a method for manufacturing the same which provides a uniform cell gap.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described, a liquid crystal display device includes a first substrate and a second substrate facing each other, a plurality of gate lines and a plurality of data lines on the first substrate crossing each other to define pixel regions, a black matrix layer on the second substrate in regions corresponding to the gate lines and the data lines, color filter layers on the second substrate covering at least the pixel regions, a plurality of column spacers on respective portions of the black matrix layer excluding the color filter layers, and a liquid crystal layer between the first substrate and the second substrate.

In another aspect, a method for manufacturing a liquid crystal display device includes facing a first substrate to a second substrate, forming a plurality of gate lines and a plurality of data lines crossing each other on the first substrate to define pixel regions, forming a black matrix layer on the second substrate in regions corresponding to the gate lines and the data lines, forming color filter layers on the second substrate to cover at least the pixel regions, forming a plurality of column spacers on respective portions of the black matrix layer excluding the color filter layers, and forming a liquid crystal layer between the first substrate and the second substrate.

In another aspect, a method for manufacturing a liquid crystal display device includes forming a black matrix lattice on a first substrate to define pixel regions, wherein the pixel regions are regularly disposed each other in a first direction and a second direction, respectively, forming color filter layers to cover pixel regions in the second direction and portions of the black matrix lattice between the adjacent to each other in a second direction, each of color filters being formed larger within each pixel region than within the corresponding covered portion of the black matrix lattice to provide uncovered portions of the black matrix lattice between the adjacent pixel regions; and forming a column spacer on one or more of the uncovered portions corresponding to the color filters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to exemplary embodiments of the present invention, which are illustrated in the accompanying drawings. Wherever possible, the same reference numbers will be used throughout the drawings to refer to the same or like parts.

Figure 1:
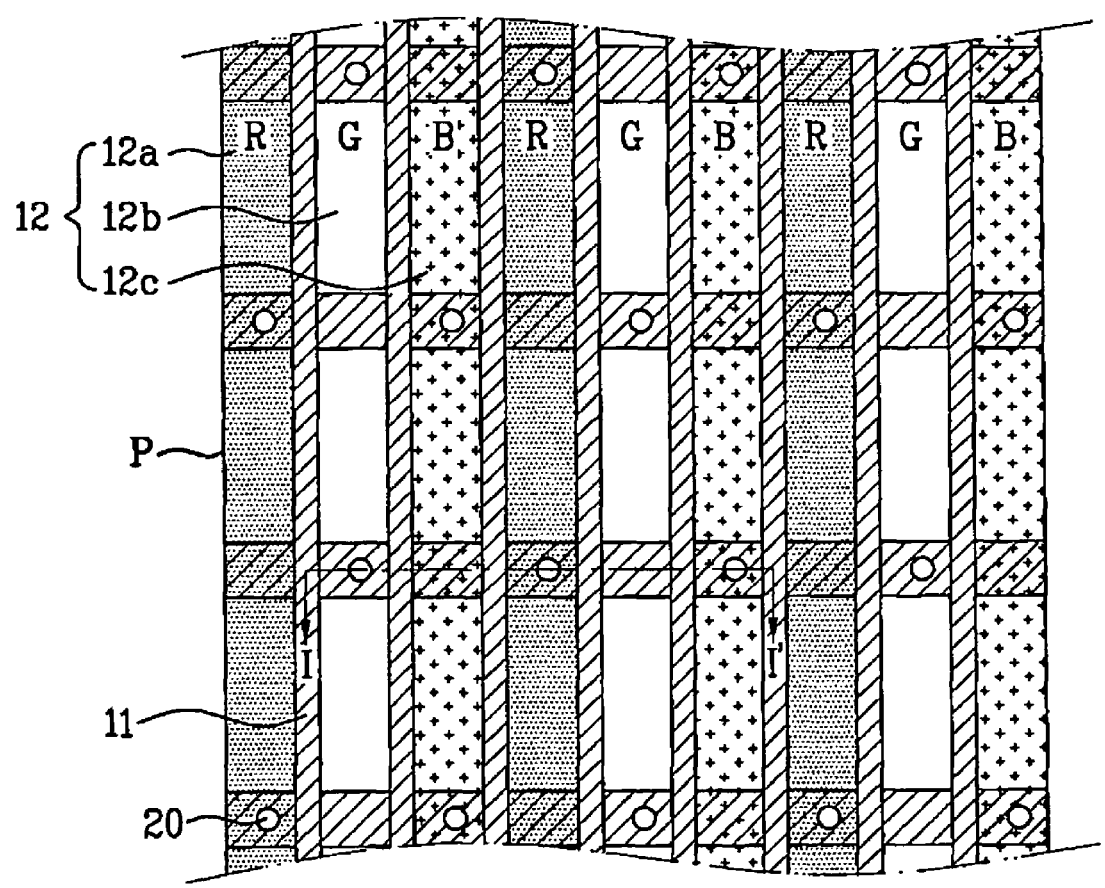
FIG. 1 shows a planar view of a first substrate of the related art LCD device.
Figure 2:
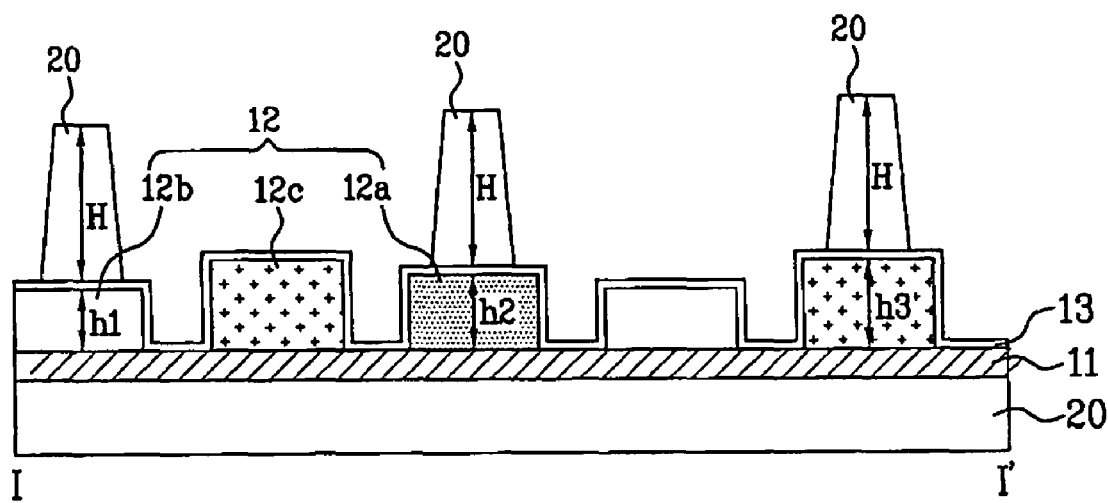
FIG. 2 shows a cross-sectional view along line I-I' of FIG. 1.
Figure 3:
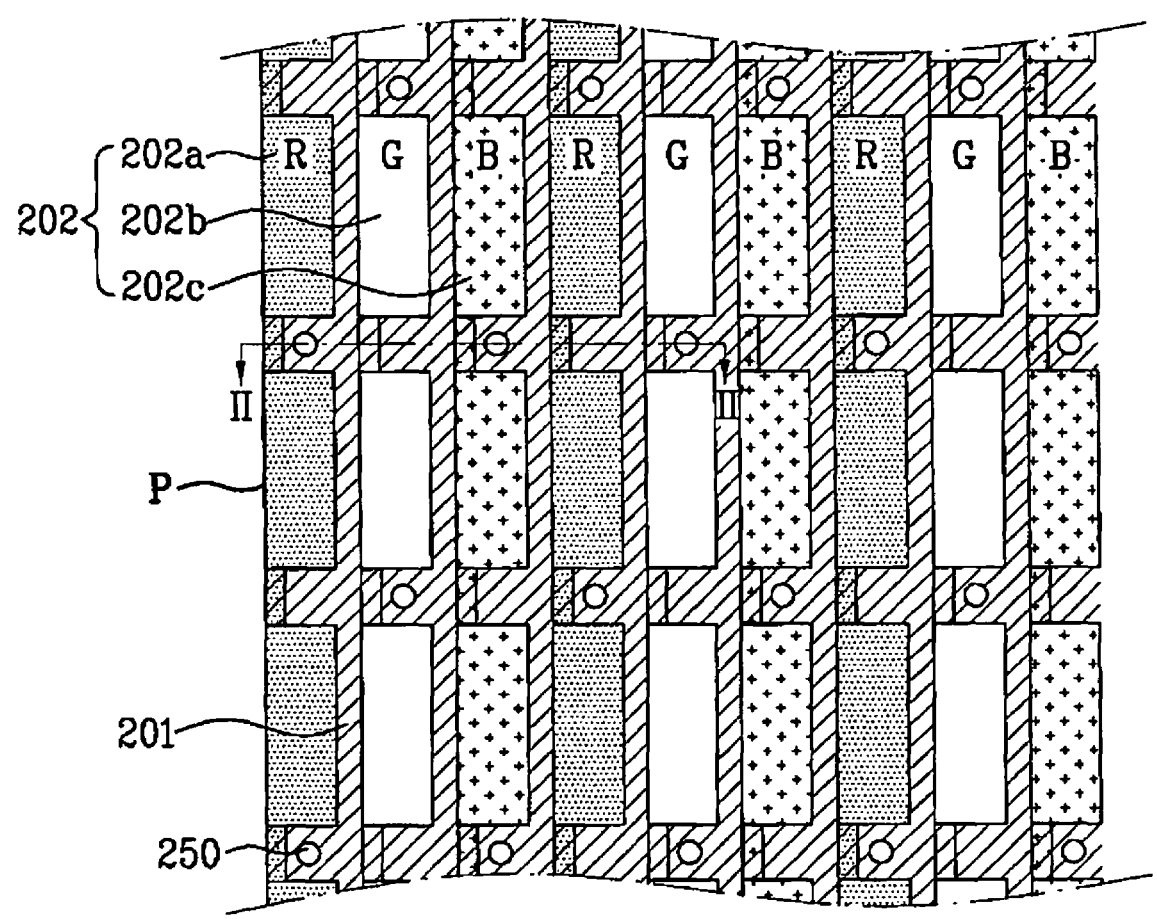
FIG. 3 shows a planar view of a first substrate of an LCD device according to an embodiment the present invention.

FIG. 3 shows a planar view of a first substrate of an LCD device according to an embodiment the present invention. Referring to FIG. 3, a black matrix layer 201 is formed on a first substrate 200 in a region other than pixel regions P. The first substrate 200 also includes color filter layers 202 (202a, 202b and 202c). The color filter layers 202a, 202b and 202c are spaced apart from one another on the first substrate 200 including the black matrix layers 201. The first substrate 200 also includes a common electrode 203. The common electrode 203 is formed over the entire upper surface 200 including the black matrix layer 201 and the color filter layers 202. The first substrate 200 also includes column spacers 250 respectively formed on the common electrode 203 in regions corresponding to predetermined portions of the black matrix layer 201.

The color filter layers 202 include first patterns having a first width each formed in a corresponding pixel region P. The color filter layers 202 also include second patterns having a second width, smaller than the first width, and connecting the first patterns formed in the corresponding adjacent upper and lower pixel regions P. Each column spacer 250 is formed between the adjacent first patterns in a region where no second pattern is formed. The region where each column spacer 250 is formed to correspond to the region where each gate line is formed on a second substrate.

Figure 4:
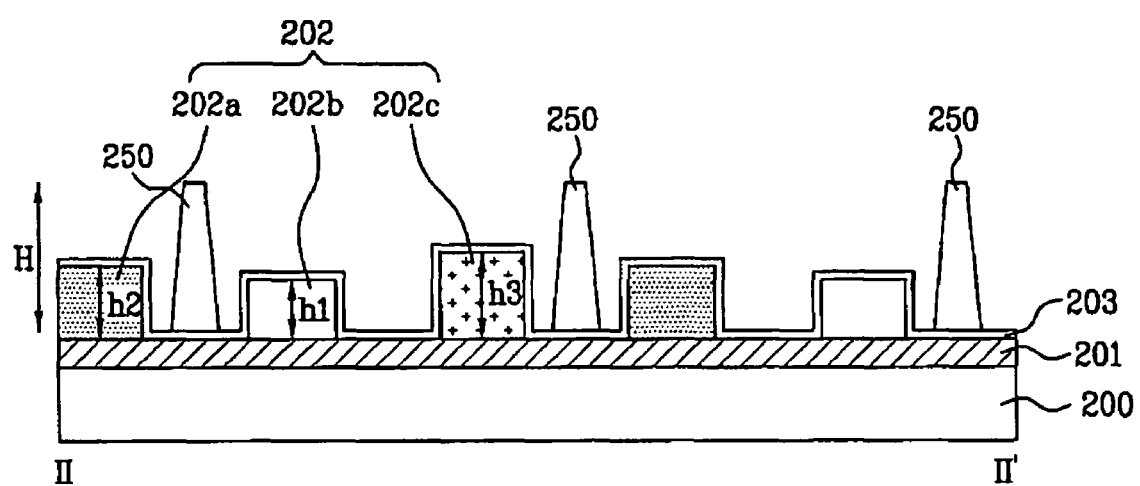
FIG. 4 shows a cross-sectional view along line II-II' of FIG. 3.

FIG. 4 shows a cross-sectional view along line II-II' of FIG. 3. As shown in FIG. 4, each of the color filter layers 202 may have a height different from that of the other color filter layers 202 to compensate for a difference in transmissivity caused by different material characteristics of the R, G and B color filter layers 12a, 12b and 12c, and thus, provide a uniform transmissivity across the entire surface of the LCD device. However, the column spacers 250 have the same height with respect to the upper surface of the first substrate 200, irrespective of the difference in height between the color filter layers 12a, 12b and 12c. The uniform height is provided by forming the column spacers 250 on a uniformly-leveled surface of portions of the black matrix layer 201 and common electrode 203 corresponding to regions where there is no color filter.

Figure 5A:
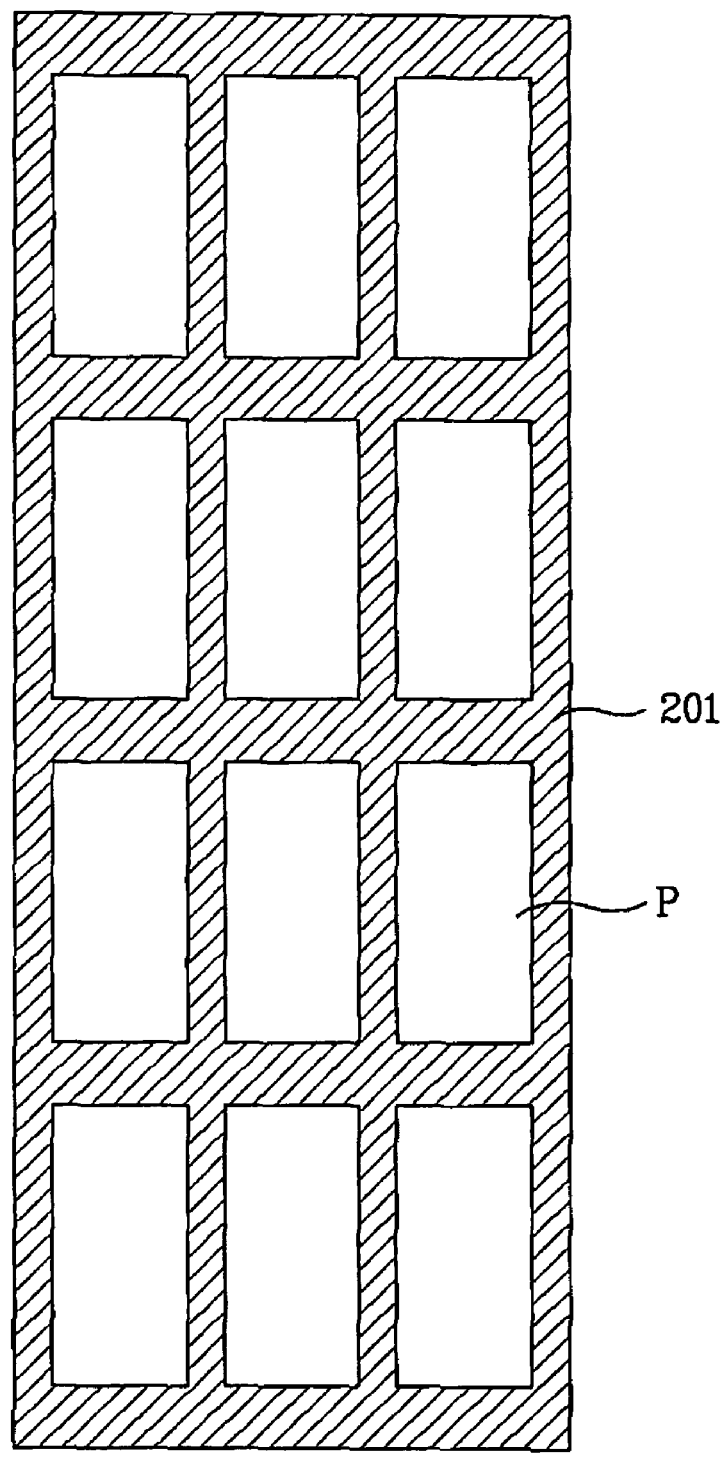
FIGS. 5A and 5B are planar views of an exemplary process for forming black matrix and color filter layers according to an embodiment of the invention.
Figure 5B:
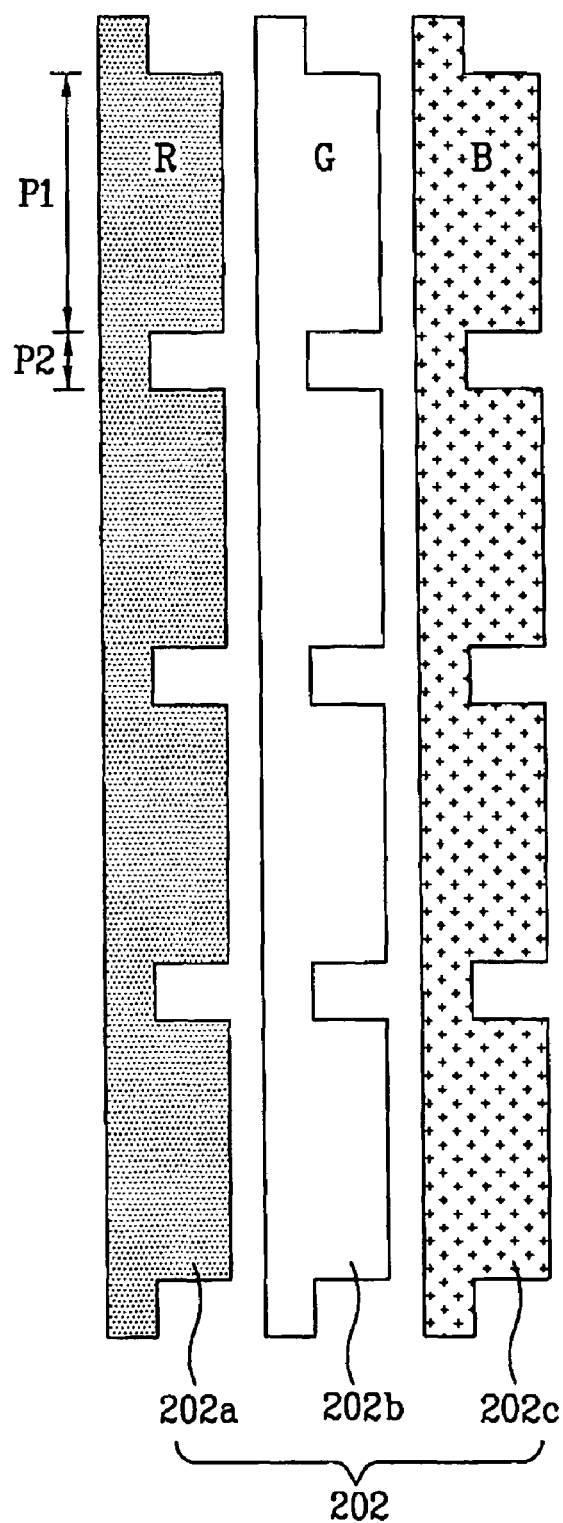

FIGS. 5A and 5B are planar views of an exemplary process for forming black matrix and color filter layers according to an embodiment of the invention. Referring to FIG. 5A, the black matrix layer 201 is formed to correspond to a region other than the pixel regions P. The black matrix layer 201 has a lattice structure corresponding to the gate lines and data lines of the second substrate. The black matrix layer 201 may be made of a light-shielding metal or black resin. Accordingly, the black matrix layer 201 blocks light from being transmitted through the regions covered therewith.

Referring to FIG. 5B, the R, G and B color filter layers 202a, 202b and 202c are subsequently formed. The respective R, G and B color filter layers 202a, 202b and 202c include first patterns P1 having a first width. Each of the first patterns P1 is formed in a corresponding pixel region P. The respective R, G and B color filter layers 202a, 202b and 202c also include second patterns having a second width smaller than the first width, integrally connected to the first patterns P1. Thus, the first and second patterns P1 and P2 form a continuous structure. For example, each of the R, G and B color filter layers 202a, 202b and 202c including the first patterns P1 and second patterns P2 may be formed by a single patterning process. In an embodiment, the R, G and B color filter layers 202a, 202b and 202c may have the same shape. In another embodiment, the color filter layers may be different in shape, so that the first patterns P1 thereof may have the same shape, while the second patterns P2 have different shapes. For example, as shown in FIG. 5B, when the second pattern P2 of the R color filter layer 202a is arranged at a left side, the second pattern P2 of the G color filter layer 202b or B color filter layer 202c may be arranged at a center or right side. The second pattern P2 is formed to have a width smaller than the first pattern P1. Thus, a space is provided between adjacent first patterns P1, in which each column spacer is to be formed in a region where no second pattern P2 is formed.

In accordance with an embodiment of the invention, the color filter layers are not formed in the form of islands in pixel regions P, but formed to include the first pattern P1 and second pattern P2. This is because separate patterns in the form of islands may cause an increase in pattern loss. Furthermore, when the alignment of the patterns is poor, the patterns may be formed in regions other than pixel regions P.

The width of the first pattern P1 on each of the R, G and B color filter layers 202a, 202b and 202c may be equal to or greater than the width of the corresponding pixel region P. Accordingly, the first pattern P1 may partially overlap the black matrix layer 201 underneath at left and right sides thereof, without overlapping the adjacent color filter layer.

Hereinafter, the formation of the R, G and B color filter layers 202a, 202b and 202c will be explained. A color filter formation layer is formed over the first substrate 200 including the black matrix layer 201. A photoresist film pattern is selectively formed on portions of the color filter formation layer corresponding to regions where the color filter layers are to be formed. Then, the color filter formation layer is exposed to light and patterned, using the photoresist film pattern as a mask, to remove an unnecessary portion of the color filter formation layer. In this case, the photoresist film pattern is a positive photoresist film pattern. When the photoresist pattern is made of a negative photoresist material, it has a pattern shape opposite to that of the positive photoresist pattern. When the color filter formation layer is formed of a photoresist material, the color filter formation layer may be directly exposed to light and patterned, without forming any photoresist film pattern.

Referring back to FIG. 3, each column spacer 250 is formed to correspond to a region where no second pattern P2 is formed, between the adjacent first patterns P1 in the respective R, G and B color filter layers 202a, 202b and 202c. The column spacers 250 may have a regular arrangement. For example, the column spacers 250 may be formed at respective pixel regions P. Alternatively, the column spacers 250 may be arranged such that one out of two adjacent pixels has a column spacer. The arrangement of the column spacers 250 may be determined depending on the density of column spacers required within the liquid crystal cells. The column spacers may have various arrangements. The arrangement of the column spacers may also be varied depending on the size of the column spacers.

A motivation for forming column spacers 250 between adjacent first patterns P in regions where there is no second pattern P2 is as follows. These regions correspond to leveled gate line regions of the second substrate, and reflect no difference in level among color filter layers 202a, 202b and 202c. Accordingly, the column spacers 250 can be formed on regions flush with one another in both the first and second substrates.

In an embodiment, each column spacer 250 may be arranged between laterally adjacent color filter layers corresponding to different colors. Accordingly, each column spacer 250 is located in a region where there is no color filter layer. However, the regions of the column spacer 250 correspond to data lines in the second substrate. Hence, steps may be formed in regions of the second substrate corresponding to the gate lines. Accordingly, processes associated with the second substrate are performed using four masks for formation of the gate lines, formation of a semiconductor layer and data lines, formation of passivation film holes, and formation of pixel electrodes. In this case, the semiconductor layer is formed beneath the data lines. As a result, the second substrate includes another material layer. Thus, the regions corresponding to the data lines are relatively susceptible to an occurrence of tolerance, as compared to those of gate lines. Furthermore, in a structure requiring a high aperture ratio, overlap of patterns or pixel electrodes may occur in the second substrate so that it is difficult to obtain leveled regions, as compared to those of the gate lines.

In accordance with an embodiment of the invention, the column spacers 250 are formed on the regions corresponding to the gate lines. For example, portions of the color filters overlapping the gate lines are removed. Then, the column spacers 250 are formed in regions corresponding to the eliminated color filter portions. Thus, the column spacers 250 can be formed on regions flush with one another in both the first and second substrates, thereby ensuring a uniform cell gap in the overall region by the column spacers 250.

The column spacers 250 may be formed on the gate lines 101 while having a horizontal cross-section with a variety of shapes including circular and square shapes.

Hereinafter, the structure of the second substrate in the LCD device according to the present invention, and a state in which the first substrate, on which column spacers are formed, is joined to the second substrate, will be described in detail.

Figure 6:
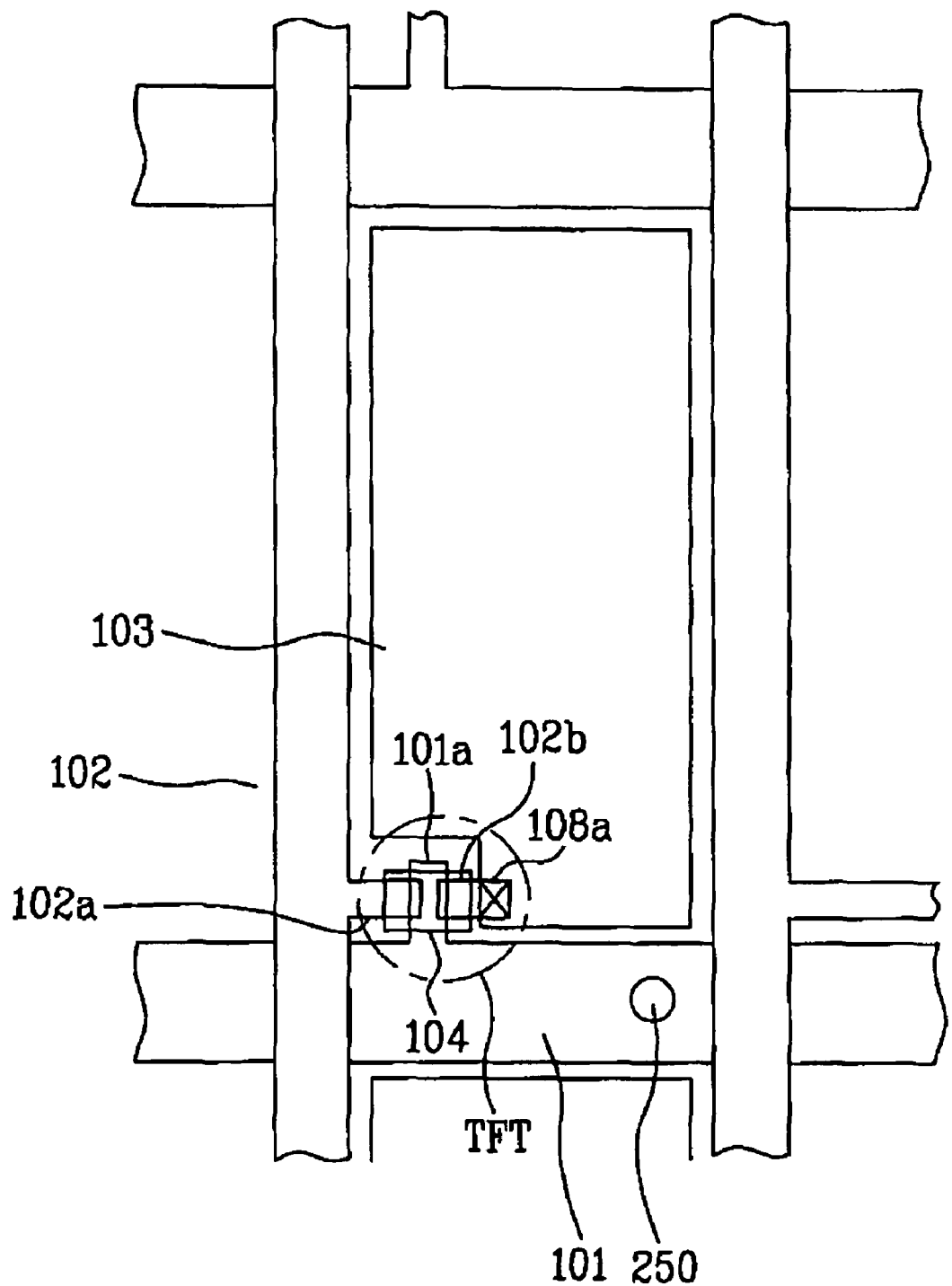
FIG. 6 shows a planar view of an exemplary second substrate for the LCD device according to an embodiment of the invention.
Figure 7:
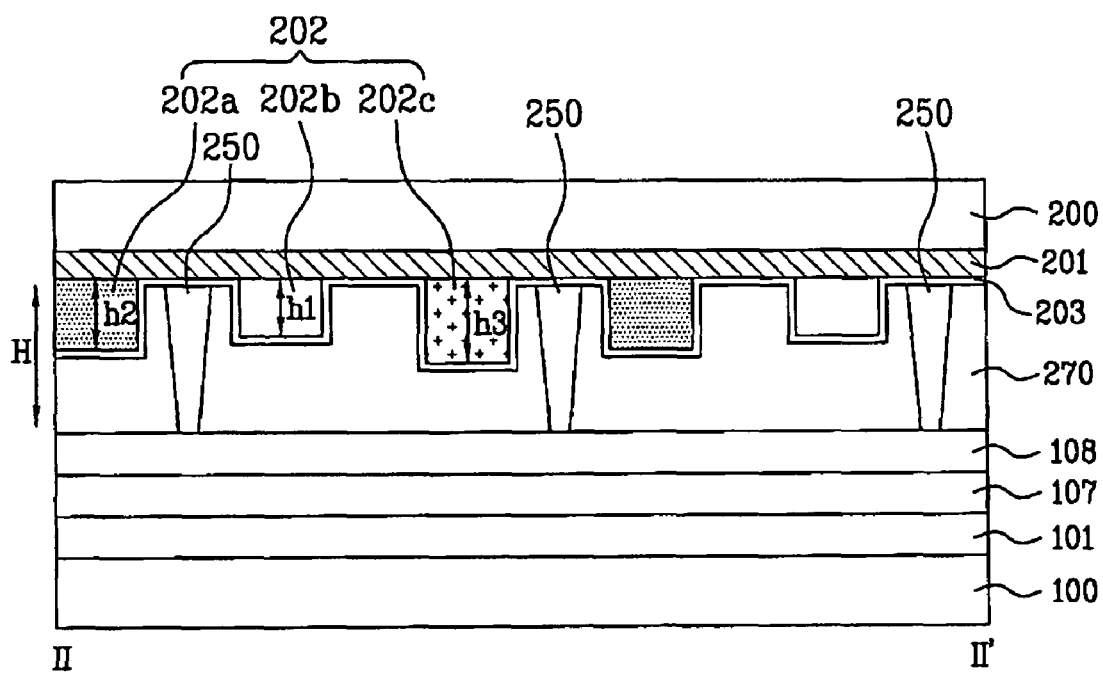
FIG. 7 shows a cross-sectional view of an exemplary LCD panel according to an embodiment of the invention.

FIG. 6 shows a planar view of an exemplary second substrate for the LCD device according to an embodiment of the invention. FIG. 7 shows a cross-sectional view of an exemplary LCD panel according to an embodiment of the invention. Referring to FIGS. 6 and 7, the second substrate includes gate lines 101 and data lines 102 crossing each other to define pixel region P (shown in FIG. 3). The second substrate also includes thin film transistors (TFTs) each located at a crossings of the corresponding data line and gate line, and pixel electrodes 103 formed to correspond to the respective pixel regions P. Each TFT includes a gate electrode 101a protruding from the corresponding gate line 101, a source electrode 102a protruding from the corresponding data line 102, and a drain electrode 102b protruding from the source electrode 102a.

A gate insulating film 107 is formed over the entire surface of the second substrate 100 including the gate electrode 101a. A semiconductor layer 104 is formed in a region corresponding to each gate electrode 101a on the gate insulating film 107. The source electrode 102a and drain electrode 102b of the each TFT are formed to contact both sides of an upper surface of the corresponding semiconductor layer 104, respectively.

A passivation film 108 is formed over the entire surface of the second substrate 200 including the data lines 102, the source electrodes 102a, and the drain electrodes 102b. A passivation film hole 108a is formed to expose a portion of each drain electrode 102b. Each pixel electrode 103 is formed to contact the drain electrode 102b within the corresponding passivation hole 108a.

The region illustrated in FIG. 7 corresponds to one gate line 101 extending in one direction. The second substrate 100 has a leveled surface in accordance with the sequential formations of the gate insulating film 107 and the passivation film 108 on the gate line 101. Meanwhile, at the side of the first substrate 200, the black matrix layer 201 thereof is formed in regions corresponding to the gate line 101. The second patterns of the color filter layers 202 (202a, 202b and 202c) are formed on predetermined regions of the black matrix layer 201, respectively. On the other hand, there is no color filter layer 202 in the remaining region of black matrix layer 201. The common electrode 203 is formed over the entire upper surface including the black matrix layer 201 and color filer layers 202. The column spacers 250 are formed on uniformly-leveled surfaces provided by portions of the black matrix layer 201 and common electrode 203 corresponding to regions excluding the color filters.

As illustrated in FIG. 7, at the side of the first substrate 200, the column spacers 250 are arranged on uniformly-leveled surfaces provided by portions of the black matrix layer 201 and common electrode 203. Meanwhile, at the side of the second substrate 100, the column spacers 250 are arranged on uniformly-leveled surfaces provided by portions of the gate line 101, gate insulating film 107 and passivation film 108. Thus, a uniform cell gap is ensured in the entire region.

A liquid crystal layer 270 is sealed between the first substrate 200 and the second substrate 100. In this case, since column spacers 250 flush with one another are interposed between the first substrate 200 and the second substrate 100, it is possible to calculate a desired amount of the liquid crystal material, based on the height of the column spacers 250. Also, the column spacers 250, which support the first and second substrates 200 and 100, are located on the leveled surfaces, respectively, thereby causing no difference in cell gap among different regions after filling of the liquid crystal. As a result, it is possible to prevent an occurrence of defects due to insufficient or excessive liquid crystal material.

In an embodiment of the invention, the fabricated LCD device operate in a TN mode. In another embodiment, the LCD device may operate in an in-plane switching (IPS) mode. For example, the common electrode 203 may be eliminated from the first substrate 200 as shown in FIG. 7. In this case, the column spacers 250 are arranged on a leveled surface provided by portion of the black matrix layer 201 corresponding to regions where there is no color filter, while corresponding to predetermined portions of the gate lines.

In accordance with an embodiment of the invention, the column spacers are arranged on predetermined portions of the gate lines on the first substrate. Also, the column spacers are arranged on uniformly-leveled surfaces provided by portions of the black matrix layer corresponding to regions where there is no color filter on the second substrate. As a result, the column spacers can correspond to regions flush with one another. Accordingly, regardless of a difference in thickness among color filter layers having different colors, and a difference in thickness among the structures formed on the first and second substrates, the column spacers can have a uniform level in both the first and second substrates. Thus, a uniformity in cell gap is ensured in the entire region.

In accordance with an embodiment of the invention, an accurate estimate of a desired amount of the liquid crystal material can be made based on the height of the column spacers. Also, the column spacers, which support the first and second substrates 200 and 100, are located on the leveled surfaces, respectively, thereby causing no difference in cell gap among different regions after filling of the liquid crystal material. As a result, it is possible to prevent an occurrence of defects due to insufficient or excessive amount of liquid crystal material.

It will be apparent to those skilled in the art that various modifications and variations can be made in embodiments of the present invention. Thus, it is intended that embodiments of the present invention cover the modifications and variations of the embodiments described herein provided they come within the scope of the appended claims and their equivalents.

What is claimed is:

1. A liquid crystal display device, comprising:
   a first substrate and a second substrate facing each other;
   a plurality of gate lines and a plurality of data lines on the first substrate crossing each other to define pixel regions;
   a black matrix layer on the second substrate in regions corresponding to the gate lines and the data lines;
   color filter layers on the second substrate covering at least the pixel regions, formed in a column direction, wherein each of the color filter layers includes: first and second patterns corresponding to first and second adjacent pixel regions in the column direction, each of the first and second patterns having a first width; and third patterns in regions corresponding to the gate lines, the third pattern integrally connected to the first and second patterns, each of the third patterns having a second width smaller than the first width, wherein the color filter layers have different thicknesses;
   a plurality of column spacers on respective portions of the black matrix layer excluding the color filter layers, wherein each of the column spacers is confined where the third pattern is not formed between the first and second patterns; and
   a liquid crystal layer between the first substrate and the second substrate.

2. The liquid crystal display device of claim 1, wherein the color filter layers include red, green and blue color filters.

3. The liquid crystal display device of claim 1, further comprising a common electrode over the entire surface of the second substrate including the black matrix layer and the color filter layers.

4. The liquid crystal display device of claim 1, wherein the column spacers are formed in the regions corresponding to the gate lines.

5. A method for manufacturing a liquid crystal display device, comprising:
   facing a first substrate to a second substrate;
   forming a plurality of gate lines and a plurality of data lines crossing each other on the first substrate to define pixel regions;
   forming a black matrix layer on the second substrate in regions corresponding to the gate lines and the data lines;
   forming color filter layers on the second substrate to cover at least the pixel regions in a column direction, wherein each of the color filter layers includes: first and second patterns corresponding to first and second adjacent pixel regions in the column direction, each of the first and second patterns having a first width; and third patterns in regions corresponding to the gate lines, the third pattern integrally connected to the first and second patterns, each of the third patterns having a second width smaller than the first width, wherein the color filter layers have different thicknesses;
   forming a plurality of column spacers on respective portions of the black matrix layer excluding the color filter layers, wherein each of the column spacers are confined where the third pattern is not formed, between the first and second patterns; and
   forming a liquid crystal layer between the first substrate and the second substrate.

6. The method of claim 5, wherein the color filter layers include red, green and blue color filters.

7. The method of claim 5, further comprising forming a common electrode over the entire surface of the second substrate including the black matrix layer and the color filter layers.

8. The method of claim 5, wherein the column spacers are formed in the regions corresponding to the gate lines.

9. A method for manufacturing a liquid crystal display device, comprising:
   forming a black matrix lattice on a first substrate to define pixel regions, wherein the pixel regions are regularly disposed with respect to each other in a first direction and a second direction, respectively;
   forming color filter layers on the first substrate to cover at least the pixel regions in the second direction, wherein each of the color filter layers includes: a plurality of first patterns to cover each pixel region in the second direction and second patterns to integrally connect the adjacent first patterns in the second direction, each of the first patterns having a first width and each of the second patterns having a second width smaller than the first width, and the second patterns formed directly on the black matrix lattice, wherein the color filter layers have different thicknesses; and
   forming a column spacer on the black matrix lattice between the adjacent pixel regions in the second direction excluding the color filter layers, wherein the column spacer is confined where the second pattern is not formed.

10. The method of claim 9, further comprising forming a plurality of gate lines and a plurality of data lines on a second substrate facing the first substrate in correspondence with the black matrix lattice.

11. The method of claim 10, further comprising forming a liquid crystal layer between the first and second substrates.

12. The method of claim 9, wherein each of the color filter layers include one of red, green and blue color filters.

13. The method of claim 9, further comprising forming a common electrode over the entire surface of the first substrate including the black matrix lattice and the color filter layers.

* * * * *